US006601786B2

(12) United States Patent
Yamaguchi et al.

(10) Patent No.: US 6,601,786 B2
(45) Date of Patent: Aug. 5, 2003

(54) FUEL INJECTION VALVE

(75) Inventors: Yukio Yamaguchi, Okazaki (JP); Takayuki Hokao, Anjo (JP)

(73) Assignee: Denso Corporation, Kariya (JP)

( * ) Notice: Subject to any disclaimer, the term of this patent is extended or adjusted under 35 U.S.C. 154(b) by 54 days.

(21) Appl. No.: 09/852,636

(22) Filed: May 11, 2001

(65) Prior Publication Data

US 2001/0040194 A1 Nov. 15, 2001

(30) Foreign Application Priority Data

May 12, 2000 (JP) ....................................... 2000-139702

(51) Int. Cl.[7] .......................... B05B 1/30; F02M 51/00; F02M 61/20; F16K 31/02

(52) U.S. Cl. ............................... 239/585.4; 239/585.3; 239/585.1; 239/533.9; 251/129.21

(58) Field of Search .......................... 239/585.1, 585.3, 239/585.4, 585.5, 533.2, 533.9, 533.3, 533.7; 251/127, 129.15, 129.21

(56) References Cited

U.S. PATENT DOCUMENTS

| | | | | | |
|---|---|---|---|---|---|
| 4,944,486 | A | * | 7/1990 | Babitzka | 251/129.21 |
| 4,967,966 | A | * | 11/1990 | Babitzka et al. | 239/585.4 |
| 5,232,166 | A | * | 8/1993 | Reiter | 239/585.4 |
| 5,285,969 | A | * | 2/1994 | Greiner et al. | 239/463 |
| 5,314,122 | A | * | 5/1994 | Winter | 239/585.1 |
| 5,462,231 | A | * | 10/1995 | Hall | 239/585.4 |
| 5,544,816 | A | * | 8/1996 | Nally et al. | 239/585.5 |
| 5,944,262 | A | * | 8/1999 | Akutagawa et al. | 239/585.4 |
| 6,131,826 | A | * | 10/2000 | Teiwes | 239/533.11 |
| 6,209,806 | B1 | * | 4/2001 | Pace et al. | 239/585.5 |
| 6,360,960 | B1 | * | 3/2002 | Nally, Jr. et al. | 239/5 |
| 6,422,481 | B2 | * | 7/2002 | Ren et al. | 239/13 |

FOREIGN PATENT DOCUMENTS

| | | |
|---|---|---|
| EP | 0 602 001 | 6/1994 |
| JP | 8-303327 | 11/1996 |

* cited by examiner

*Primary Examiner*—Michael Mar
*Assistant Examiner*—Darren Gorman
(74) *Attorney, Agent, or Firm*—Nixon & Vanderhye P.C.

(57) ABSTRACT

In a fuel injection valve, a cylindrical valve body has a valve seat protruding radially inward out of an inner wall thereof and a needle supporting cylindrical inner wall. A nozzle needle is fixed to the armature so as to move together with the armature, while being supported slidably by the needle supporting cylindrical inner wall. The nozzle needle is provided with a valve portion to be seated on the valve seat when a coil is de-energized and inside thereof with a cavity into which fuel is introduced. A fuel accumulation bore is provided between inner circumference of the cylindrical valve body and outer circumference of the nozzle needle. With the construction mentioned above, the nozzle needle is provided with an opening through which the cavity communicates with the fuel accumulation bore.

12 Claims, 6 Drawing Sheets

FUEL INJECTION VALVE

CROSS REFERENCE TO RELATED APPLICATION

This application is based upon and claims the benefit of priority of Japanese Patent Application No. 2000-139702 filed on May 12, 2000, the content of which is incorporated herein by reference.

BACKGROUND OF THE INVENTION

1. Field of the Invention

The present invention relates to a fuel injection valve for an internal combustion engine (hereinafter called as an engine).

2. Description of Related Art

As shown in FIG. 6, a conventional fuel injection valve 100 has a nozzle needle 101 that is slidably and reciprocatingly supported by a sliding portion 102. The sliding portion 102 is provided with a plurality of cuts for forming fuel passages. The cuts of the sliding portion 102 also serve as vapor passages through which vapor generated by heat near injection holes moves toward a side of fuel upstream. A contact portion 103 formed at an end of the nozzle needle 101 on a side of fuel injection may be seated on a valve seat 105*a* formed in a valve body 105.

An armature 111 is connected with the nozzle needle 101 at a position facing a stator 110 and is biased in a valve closing direction by a spring 112. Since the armature 111 and the sliding portion 102 are slidably and reciprocatingly supported by the valve body 105, the nozzle needle 101 can make a reciprocating movement accurately along a center axis thereof. Generally, the stator 110 and the armature 111 are made of lower toughness material and are plated with, for example, chromium to form thin film thereon. When a coil 115 is energized, the armature 111 is attracted toward the stator 110 against biasing force of the spring 112. Accordingly, the nozzle needle 101 leaves the valve seat 105*a* so that fuel is injected from the injection holes. When the coil 115 is de-energized, the contacting portion 103 is seated on the valve seat 105*a* to finish fuel injection.

It is important for better fuel consumption that fuel is supplied to the engine at an adequate timing during a period when an intake port of the engine is opened. Therefore, the fuel injection valve is required to have quick response characteristic that is largely affected by mass of a moving member including the nozzle needle 101.

According to the conventional fuel injection valve 100, the nozzle needle 101 is integrally provided with the sliding portion 102 having the cuts, whose maximum outer diameter is larger than that of the contact portion 103, for securing the fuel and vapor passages. Accordingly, among the nozzle needle 101, the sliding portion 102 and the armature 111, which constitute the moving member, the sliding portion 102 adversely affects on the quick response characteristic of the fuel injection valve because of larger mass thereof.

Further, formation of the chromium thin film on portions where the stator 110 and the armature 111 come in contact with each other results in higher manufacturing cost of the fuel injection valve.

SUMMARY OF THE INVENTION

An object of the invention is to provide a fuel injection valve in which weight of a nozzle needle is relatively light and mass of a movable member constituted by the nozzle needle and an armature is smaller so that quicker response characteristic of the injection valve is secured.

To achieve the above object, in the injection valve having a housing, a stator, an armature and a coil for exerting electromagnetic attracting force on the armature, a cylindrical valve body, which is provided with at least an injection hole, has a valve seat protruding radially inward out of an inner wall thereof, which is positioned on a side of the stator with respect to the injection hole, and a needle supporting cylindrical inner wall, which is positioned on a side of the stator with respect to the valve seat. A nozzle needle is fixed to the armature so as to move together with the armature in the cylindrical valve body, while being supported slidably by the needle supporting cylindrical inner wall. The nozzle needle is provided with a valve portion to be seated on the valve seat when the coil is de-energized and inside thereof with a cavity into which fuel is introduced. A fuel accumulation bore is provided between inner circumference of the cylindrical valve body extending axially from the valve seat to the needle supporting cylindrical inner wall and outer circumference of the nozzle needle.

With the construction mentioned above, the nozzle needle is further provided with an opening through which the cavity communicates with the fuel accumulation bore so that, when the valve portion leaves the valve seat upon energizing coil, the fuel accumulation bore communicates with the injection hole for fuel injection.

Since the nozzle needle is provided inside thereof with the cavity and with the opening through which the cavity communicates with the fuel accumulation bore, weight of the nozzle needle is lighter than that of the conventional fuel injection valve in which the nozzle needle has the cuts for forming the fuel and vapor passages between the armature accommodation bore and the fuel accumulation bore.

Preferably, the opening of the nozzle needle is opened to the highest position in the fuel accumulation bore to evacuate vapor smoothly.

It is preferable that the housing has a hollow into which fuel is flown from outside and the stator is provided with a penetrating bore communicating with the hollow of the housing at an axial end thereof and communicating with an armature accommodation bore at another axial end thereof, and the armature has a through-hole for making the armature accommodation bore on a side of the stator communicate with the cavity so that fuel is introduced from the hollow of the housing into the cavity. With this construction, the fuel injection valve becomes further lighter and more compact.

It is preferable that the nozzle needle penetrates axially along the through-hole of the armature until an axial end thereof protrudes out of an axial end of the armature toward the stator so that fuel is introduced into the cavity from the hollow of the housing via the penetrating bore. This will make it possible to manufacture the fuel injection valve at lower cost, since an air gap is automatically formed between the stator and the armature by the axial end of the nozzle needle protruding out of the end of the armature and coming in contact with the stator and, further, it is not necessary to cover the axial end of the nozzle needle with chromium thin film for reinforcement because the nozzle needle is inherently made of material having relatively higher stiffness.

Preferably, the opening of the nozzle needle is formed to axially stride over the needle supporting cylindrical inner wall so that the cavity communicates not only with the fuel accumulation bore but also with the armature accommodation bore on a side of the cylindrical valve body. With this construction, vapor generated by heat is easily evacuated from the fuel accumulation bore to the armature accommodation bore through the opening. Accordingly, fluctuation of injection characteristic due to vapor is limited.

Further, it is preferable that the needle cylindrical inner wall, whose diameter is larger than a diameter of the valve seat, is formed to protrude radially inward out of the inner wall of the cylindrical valve body. Since a diameter of the valve seat are smaller than that of the needle supporting cylindrical inner wall, the seat valve, on which the valve portion of the nozzle needle is seated, is easily and accurately machined by inserting a cutting tool from a side of the needle supporting cylindrical inner wall into an inside of the cylindrical valve body.

Moreover, preferably, the nozzle needle is provided with a small diameter column portion whose axial end on a side of the injection hole constitutes the valve portion and with a large diameter column portion whose diameter is larger than that of the small diameter column portion and which is slidably supported by the needle supporting cylindrical inner wall.

BRIEF DESCRIPTION OF THE DRAWING

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS (First Embodiment)

A fuel injection valve according to a first embodiment is described with reference to FIGS. 1 and 2.

Figure 2:
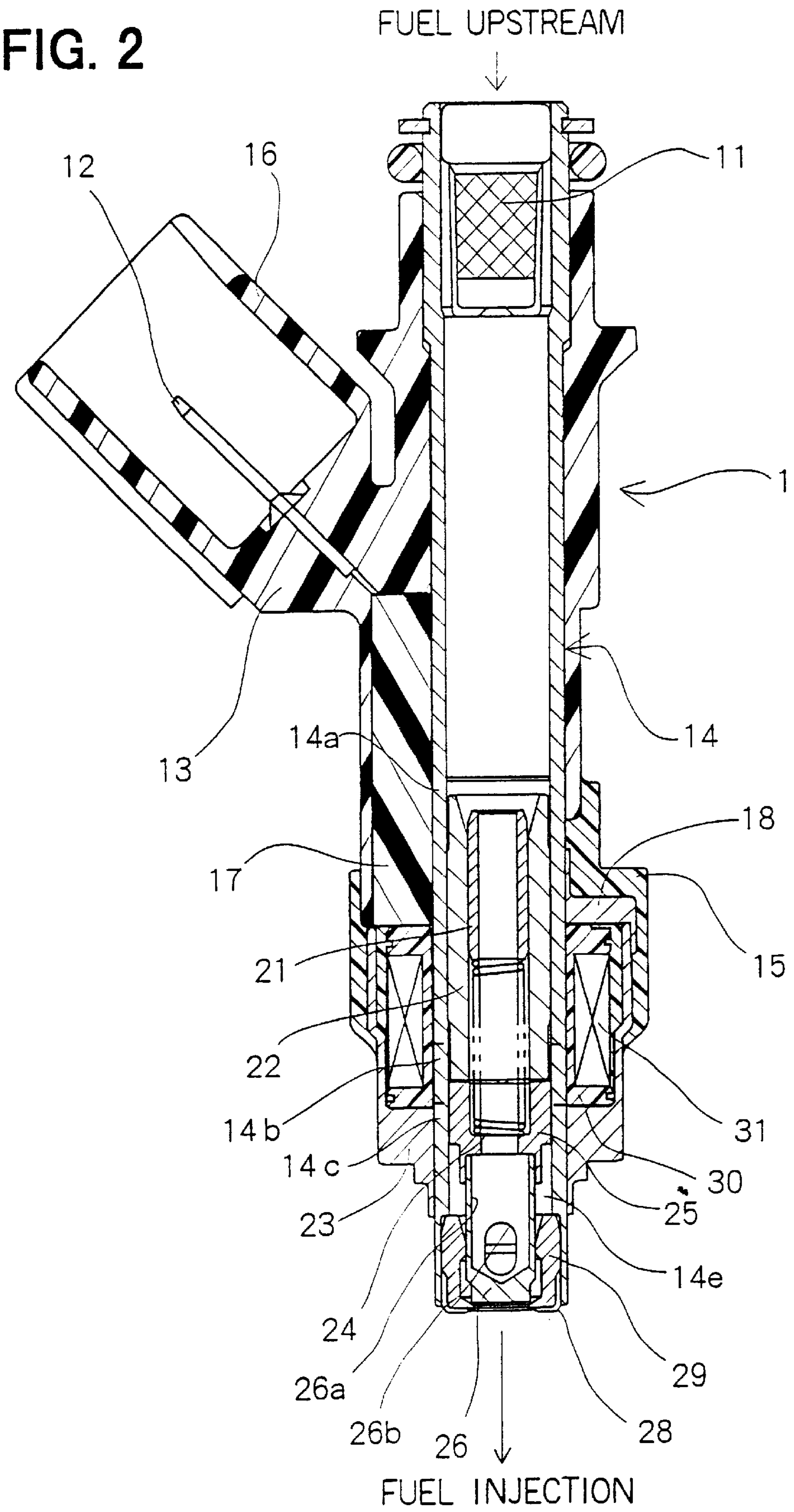
FIG. 2 is a cross sectional whole view of the fuel injection valve according to the first embodiment.

As shown in FIG. 2, a valve body 29, a nozzle needle 26, an armature 25, a stator 22, an adjusting pipe 21, a spring 24 and a filter 11 are accommodated in a cylindrical member 14.

The cylindrical member 14, for example, made of composite magnetic material, is formed in pipe shape to have both of magnetic and non-magnetic portions. The cylindrical member 14 has the non-magnetic portion partly changed by heating and is provided with a magnetic pipe portion 14*c*, a non-magnetic pipe portion 14*b* and a magnetic pipe portion 14*a*, which are positioned upward in order from a lower end thereof on a side of fuel injection. The armature 25 is housed in an armature accommodation bore 14*e* of the cylindrical member 14 in a vicinity of a boundary between the non-magnetic pipe portion 14*b* and the magnetic pipe portion 14*c*. The valve body 29 and an injection hole plate 28 are housed in the magnetic pipe portion 14*c* on a side of fuel injection. The filter 11, which filters foreign material in fuel, is installed in the cylindrical member 14 at an upper end on a fuel upstream side.

Figure 1:
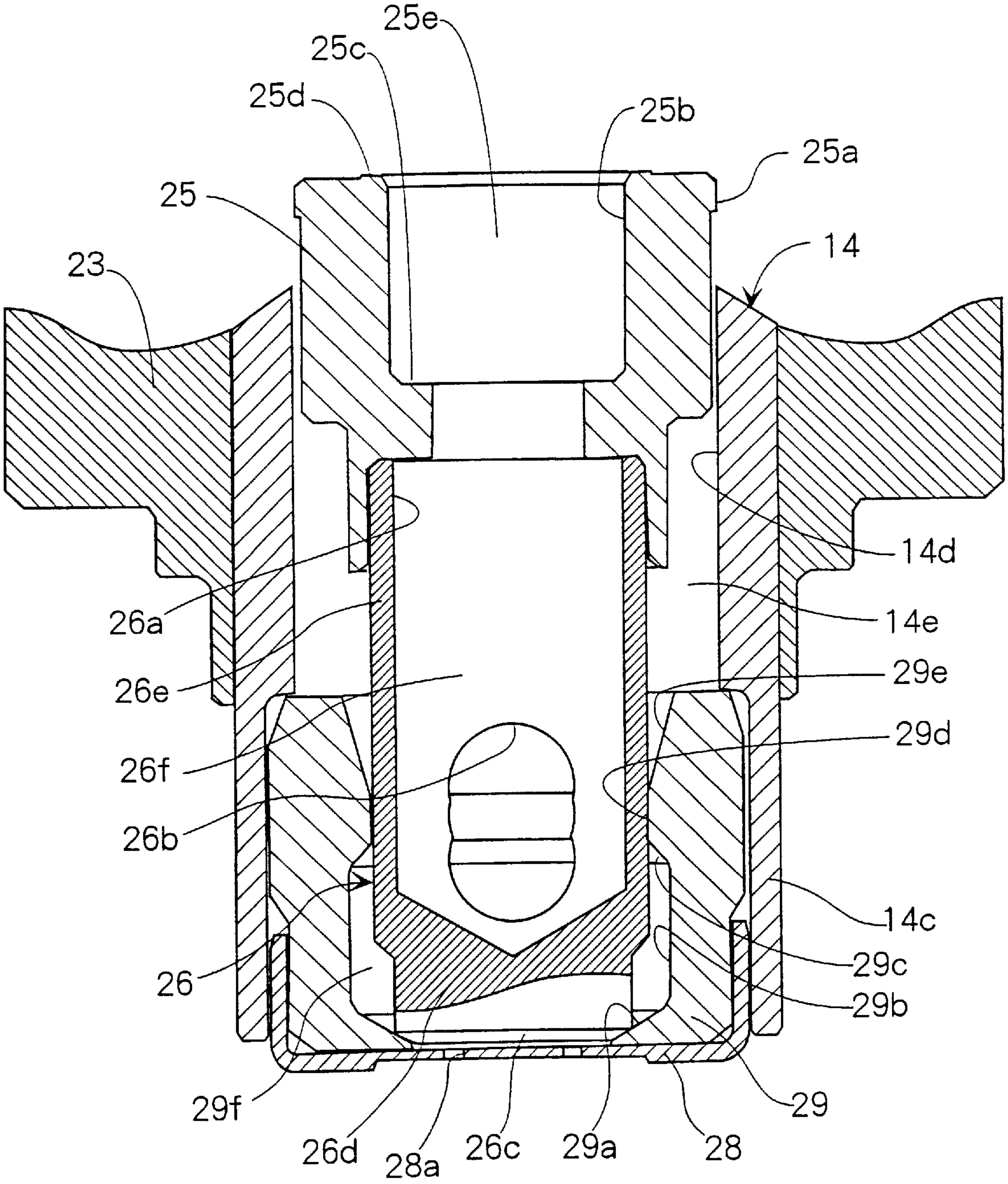
FIG. 1 is across sectional part view of a fuel injection valve according to a first embodiment of the present invention.

As shown in FIG. 1, the valve body 29, which is formed in pipe shape, is press fitted into and fixed by laser welding to an inner wall of the magnetic pipe portion 14*c*. An inner circumferential wall of the valve body 29 has a conical surface wall 29*a*, a large diameter cylindrical surface wall 29*b*, a conical surface wall 29*c*, a small diameter cylindrical surface wall 29*d* and a conical surface wall 29*e*, which are positioned in order from a side of fuel injection toward a side of fuel upstream. The conical surface wall 29*a*, whose diameter is smaller toward a side of fuel injection, is provided to form a valve seat on which a contact portion 26*c*of the nozzle needle 26 can be seated. The large diameter cylindrical surface wall 29*b*is provided to form a fuel accumulation bore 29*f*. A diameter of the conical surface wall 29 is smaller toward a side of fuel upstream. The small diameter cylindrical surface wall 29*d* constitutes a nozzle needle supporting hole whose diameter is smaller than that of the fuel accumulation bore 29*f*. A diameter of the conical surface wall 29*e* is larger toward a side of fuel upstream.

The injection hole plate 28 in cup shape is press fitted into and fixed by laser welding to an inner wall of the magnetic pipe portion 14*c*. The injection hole plate 28 is in contact with an end of the valve body 29 on a side of fuel injection. The injection hole plate 28 is formed in thin plate shape and provided in a center thereof with a plurality of injection holes 28*a*.

The nozzle needle 26 is made of stainless steel and formed in cylindrical shape having a bottom. The nozzle needle 26 is provided on a side of fuel upstream with a large diameter column portion 26*e* whose diameter is slightly smaller than an inner diameter of the small diameter cylindrical surface wall 29*d* and provided on a side of fuel injection with a small diameter column portion 26*d* whose diameter is smaller than that of the large diameter column portion 26*e* on a side of fuel upstream. It is preferable that a diameter difference between the large and small diameter column portions 26*e* and 26*d* is more than 0.1 mm in view of obtaining lighter weight of the nozzle needle 26 and easily manufacturing the valve seat.

An end corner of the small diameter column portion 26*d* on a side of fuel injection is chamfered or tapered to form a conical surface that constitutes the contact portion 26*c*. A diameter of the contact portion 26*c*, that is, a seat diameter, is smaller than that of the small diameter cylindrical surface wall 29*d*. To bring an outer wall of the large diameter column portion 26*e* in slidable contact with the small diameter cylindrical surface wall 29*d*, a slight clearance is formed therebetween. Most part of the large diameter column portion 26*e* is formed in thin cylinder shape and an inner circumferential wall 26*a* thereof constitutes an interior passage 26*f*. The interior passage 26*f* is formed by drilling a hole from an end of the large diameter column portion 26*e* on a side of fuel upstream. Length of the drilled hole is deep to an extent that a bottom of the nozzle needle 26 sufficiently endures a shock caused on seating itself on the valve seat.

An axial length of the large diameter column portion 26*e* is long to an extent that, when centerless machining forms the small diameter column portion 26*d* and the contact portion 26*c*, an outer circumferential wall of the large diameter column portion 26*e* can be held tightly by a chuck so that a center axis of the valve body does not deviate throughout a whole axial length thereof.

The large diameter column portion 26*e* is provided with outlet holes 26*b* that constitute openings of the interior passage 26*f*. The outlet holes 26*b* are positioned circumferentially at 180-degree angular intervals so as to perforate the large diameter column portion 26*e* radially. One outlet hole 26*b*, instead of the two outlet holes 24, is sufficient enough to perform an operation of the present invention. Each of the outlet holes 26*b* is formed in shape of oval or flat oval whose major axis extends axially and whose major axis length is longer than axial length of the small diameter cylindrical surface wall 29*d*. A periphery of the outlet hole 26*b* on a side of fuel injection is located at a position lower than an axial end of the small diameter cylindrical surface wall 29*d* on a side of fuel injection and opened to the fuel accumulation bore 29*f*. Another periphery of the outlet hole 26*b* on a side of fuel upstream is located at a position higher than an axial end of the small diameter cylindrical surface wall 29*d* on a side of fuel upstream and opened to the armature accommodation bore 14*e*. The shape of the outlet hole 26*b* is not limited to oval or flat oval but may be circular.

The armature 25 is fixed by laser welding to an outer wall of the large diameter column portion 26 on a side of fuel upstream. The armature 25 is made of ferromagnetic material such as magnetic stainless steel and is formed in pipe shape having steps. Inner circumferential wall 25*b* of the armature 25 is provided in middle thereof with a ring shaped projection so as to form steps on axially opposite sides thereof. Inner diameter of the armature 25 at the ring shaped projection is smallest. The step of the armature 25 on a side of fuel upstream serves as a spring seat 25*c*. An interior passage 25*e* of the armature 25 and the interior passage 26*f* of the nozzle needle 26 communicate with each other. The armature is further provided at an end on a side of fuel upstream with a flange 25*a*. An outer circumferential wall of the flange 25*a* and an inner circumferential wall of the cylindrical member 14 are in slidable contact with each other so that a slight clearance is formed therebetween.

As the outer circumferential wall of the large diameter column portion 26*e* and the small diameter cylindrical wall 29*d* are in slidable contact with each other and the outer circumferential wall of the flange 25*a* and the inner circumferential wall of the cylindrical member 14 are in slidable contact with each other, the nozzle needle 26 moves reciprocatingly along a predetermined orbit. The armature 25 is provided at an axial end thereof on a side of fuel upstream with a ring shaped projection 25*d* which comes in contact with the stator 22 with an air gap between the axial end of the armature 25 other than the ring shaped projection 25*d* and an axial end of the stator 22. A surface of the ring shaped projection 25*d* that comes in contact with the stator 22 is coated with chromium thin film.

As shown in FIG. 2, the stator 22 is made of ferromagnetic material such as magnetic stainless steel and is formed in cylindrical shape. A surface of the stator 22 that comes in contact with the armature 25 is coated with chromium thin film. The adjusting pipe 21 is press fitted and fixed into an inner wall of the stator 22. Adjusting a press fitting amount of the adjusting pipe 21 allows to change preset biasing force of the spring 24, whose one end contacts the spring seat 25*c* of the armature 25 and whose another end contacts an end of the adjusting pipe 21. The adjusting pipe 21 may be fastened to stator 22 by screws instead of being press fitted thereto.

As shown in FIG. 2, a resin spool 30 is attached to outer circumference of the cylindrical member 14. A coil 31 is wound on outer circumference of the spool 30. An outer circumference of the cylindrical member 14 is covered with a resin mold 13 and provided with a connector portion 16 protruding out of the outer wall of the resin mold 13. A terminal 12, which is connected in circuit with the coil 31, is embedded in the connector portion 16. The terminal is partly covered with a resin rib 17.

A magnetic member 23 covers around outer circumference of the coil 31. A fan shaped magnetic member 18 is disposed on a fuel upstream side of the coil 31 circumferentially at an angle of about 250 degrees not to interfere with the rib 17. A resin mold 15 is formed around outer circumferences of the magnetic members 18 and 23 and connected with the resin mold 13. The nozzle needle 26, the stator 22, the magnetic pipe portions 14*a* and 14*c* and the magnetic members 18 and 23 constitute a magnetic circuit through which magnetic flux passes on energizing the coil 31.

Fuel, which is flown into the cylindrical member 14 through the filter 11, is introduced to the fuel accumulation bore 29*f* from the outlet hole 26*b* via an interior of the adjusting pipe 21, an interior of the stator 22, the interior passage 25*e* of the armature 25 and the inner passage 26*f* of the nozzle needle 26 so that fuel reaches a portion where the contact portion 26*c* of the nozzle needle 26 is seated on the valve seat. When the contact portion 26*c* is seated on the valve seat, communication between the fuel accumulation bore 29*f* and the injection holes 28*a* is interrupted and, when the contact portion 26*c* leaves the valve seat, the fuel accumulation bore 29*f* communicates with the injection holes 28*a*.

Next, an operation of the fuel injection valve 1 is described.

Upon energizing the coil 31, the nozzle needle 26 is attracted toward the stator 22 against the biasing force of the spring 24. Accordingly, the contact portion 26*c* leaves the valve seat so that fuel is injected from the injection holes 28*a*.

Upon de-energizing the coil 31, the nozzle needle 26 receives the biasing force of the spring 24 acting in the valve closing direction so that the contact portion 26*c* is seated on the valve seat to finish the fuel injection from the injection holes 28*a*.

According to the fuel injection valve 1 mentioned above, As the outer circumferential wall of the large diameter column portion 26*e* and the small diameter cylindrical wall 29*d* are in slidable contact with each other and the outer circumferential wall of the flange 25*a* and the inner circumferential wall of the cylindrical member 14 are in slidable contact with each other, the nozzle needle 26 moves reciprocatingly along the predetermined orbit without offsetting the center axis thereof. Accordingly, the contact portion 26*c* of the small diameter column portion 26*d* comes in contact accurately with a predetermined seat position on the conical surface wall 29*a*.

During engine operation, vapor tends to be generated in fuel by heat in the fuel accumulation bore 29*f*. According to the fuel injection valve 1, the vapor moves toward the fuel upstream side from the fuel accumulation bore 29*f* through the outlet hole 26*b* so that generation of the vapor does not affect adversely on fuel injection characteristic. Further, the outlet hole 26*b* makes it possible to reduce frictional resistance between the nozzle needle 26 and the valve body 29 so that the quick response characteristic of the nozzle needle 26 is secured since a surface area where the nozzle needle 26 and the valve body 29 are in slidable contact with each other is relatively small.

Furthermore, as the interior passage 26*f* of the nozzle needle 26 constitutes a fuel passage, the outer diameter of the large diameter column portion 26*e* is relatively small and is slightly larger than or nearly equal to that of the contact portion 26*c*. A large part of the nozzle needle 26 is constituted by the large diameter column portion 26*e* whose wall thickness is relatively thin. Accordingly, mass of the movable member integrally composed of the nozzle needle 26 and the armature 25 becomes smaller, resulting in improving the quick response characteristic of the nozzle needle 26.

Moreover, as the small diameter column portion 26*d* is formed on the nozzle needle 26 on a side of fuel injection, the valve seat can be easily and accurately manufactured. In more details, it is generally required to highly accurately machine the seat portion on the conical surface wall 29*a* on which the contact portion 26*c* is fluid-tightly seated. Since the seat diameter is smaller than an inner diameter of the small diameter cylindrical surface wall 29*d* of the valve body which slidably supports the nozzle needle 26, the seat portion on the conical surface wall 29*a* can be accurately machined by inserting a cutting tool into the fuel accumulation bore 29*f* from a side of fuel upstream after the small diameter cylindrical surface wall 29*d*, the conical surface wall 29*c*, the large diameter cylindrical surface wall 29*b* and conical surface wall 29*a* are machined.

As the fuel injection valve 1 has a construction that the valve body 29 supports the large diameter column portion 26*e* of the nozzle needle 26 on a side of fuel upstream, the nozzle needle 26 can be easily and accurately machined. That is, it is necessary to machine coaxially and accurately the large diameter column portion 26*e* and the contact portion 26*c* for securing valve fluid-tightness. Since the large diameter column portion 26*e*, whose axial length is relatively long, is firmly fixed by the chuck, centerless machining can accurately form the contact portion 26*c*.

(Second Embodiment)

Figure 3:
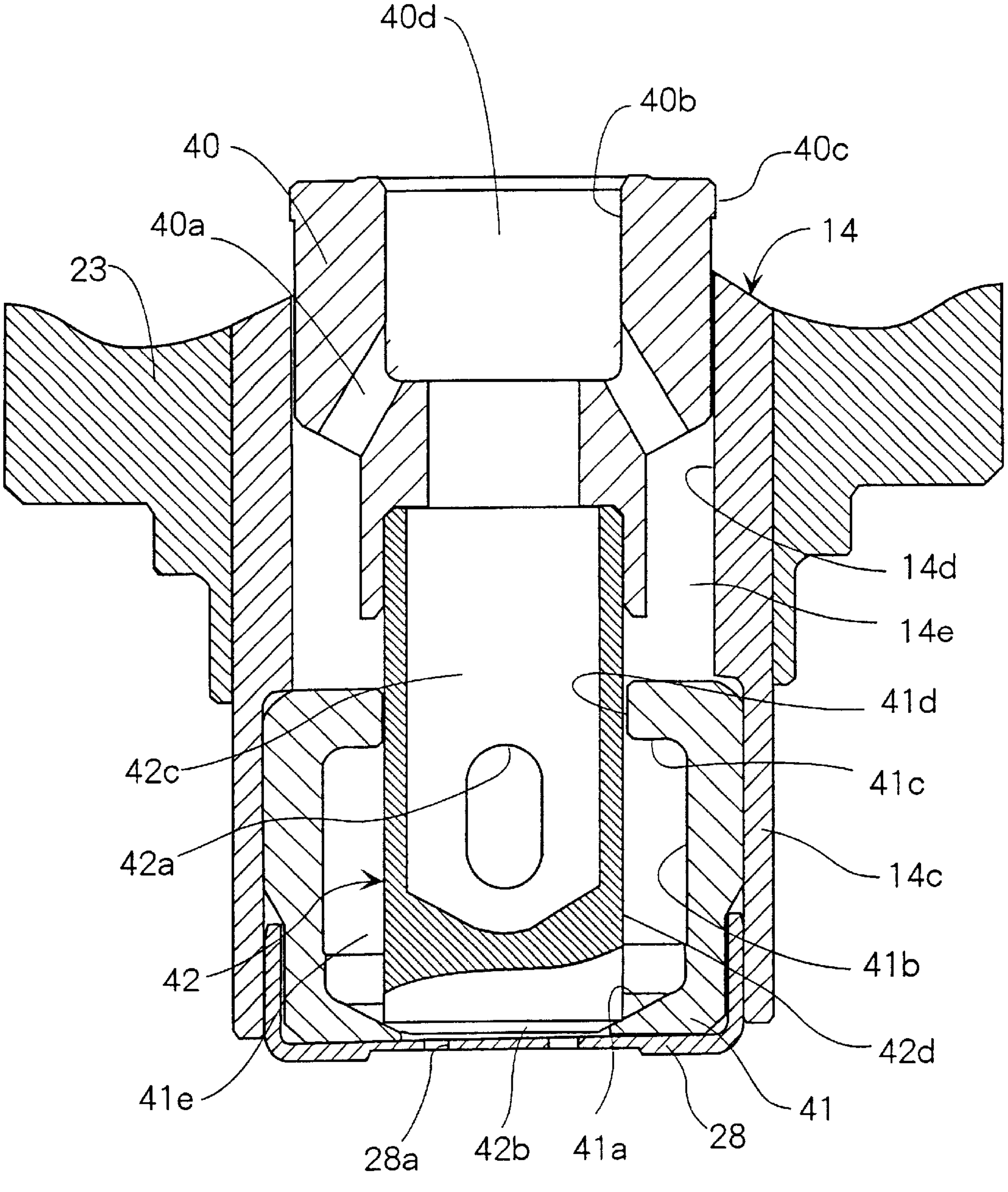
FIG. 3 is a cross sectional part view of a fuel injection valve according to a second embodiment of the present invention.

A fuel injection valve according to a second embodiment is described with reference to FIG. 3. A construction of the fuel injection valve not shown in FIG. 3 is substantially same as the fuel injection valve 1 of the first embodiment. The construction of the second embodiment substantially similar as that of the first embodiment is described with the same reference number as the first embodiment.

A valve body 41 is formed in shape of a cylinder whose peripheries of both opening ends protrude radially and inwardly. An inner circumferential wall of the valve body 41 has a conical surface wall 41*a*, a large diameter cylindrical surface wall 41*b*, a step surface wall 41*c* and a small diameter cylindrical surface wall 41*d*, which are positioned in order from a side of fuel injection toward a side of fuel upstream. The conical surface wall 41*a*, whose diameter is smaller toward a side of fuel injection, is provided to form a valve seat on which a contact portion 42*b* of the nozzle needle 42 can be seated. The large diameter cylindrical surface wall 41*b* is provided to form a fuel accumulation bore 41*e*. The small diameter cylindrical surface wall 41*d* constitutes a nozzle needle supporting hole whose diameter is smaller than that of the fuel accumulation bore 41*e*.

The nozzle needle 42 is made of stainless steel and formed in cylindrical shape having a bottom. The nozzle needle 42 has a column wall 42*d* whose diameter is identical from a side of fuel injection to a side of fuel upstream. To bring the column wall 42*d* in slidable contact with the small diameter cylindrical surface wall 41*d*, a slight clearance is formed therebetween. An interior passage 42*c* is formed by drilling a hole from an end of the nozzle needle 42 on a side of fuel upstream. Length of the drilled hole is deep to an extent that a bottom of the nozzle needle 42 sufficiently endures a shock caused on seating itself on the valve seat. An outlet hole 42, which constitute an opening of the interior passage 42*c*, is formed in oval or flat oval shape.

An interior space 40*d*, which is formed by an inner circumferential wall 40*b* of an armature 40, and the interior passage 42*c* of the nozzle needle 42 communicate with each other. Outer circumference of a flange 40*c* on the outer circumference of the armature 40 is in slidable contact with the inner circumferential wall 14*d* of the cylindrical member 14A. The armature 40 is provided at a step portion thereof with vapor passages 40*a*, through which an armature accommodation bore 14*e* and the interior space 40*d* of the armature 40 communicate with each other. The vapor passages 40*a* serve to move vapor included in fuel toward a side of fuel upstream in the armature accommodation bore 14*e*.

According to the second embodiment, it is easy to form accurately the contact portion 42*b* by centerless machining since the nozzle needle 42 has the column wall 42*d* whose diameter is identical axially. Further, as the fuel passage extending from the interior space 40*d* of the armature 40 to the fuel accumulation bore 41*e* is formed through the interior passage 42*c* and the outlet hole 42*a* of the nozzle needle 42, the mass of the nozzle needle 42 is smaller so that the quicker response of the nozzle needle 42 may be secured.

Figure 4:
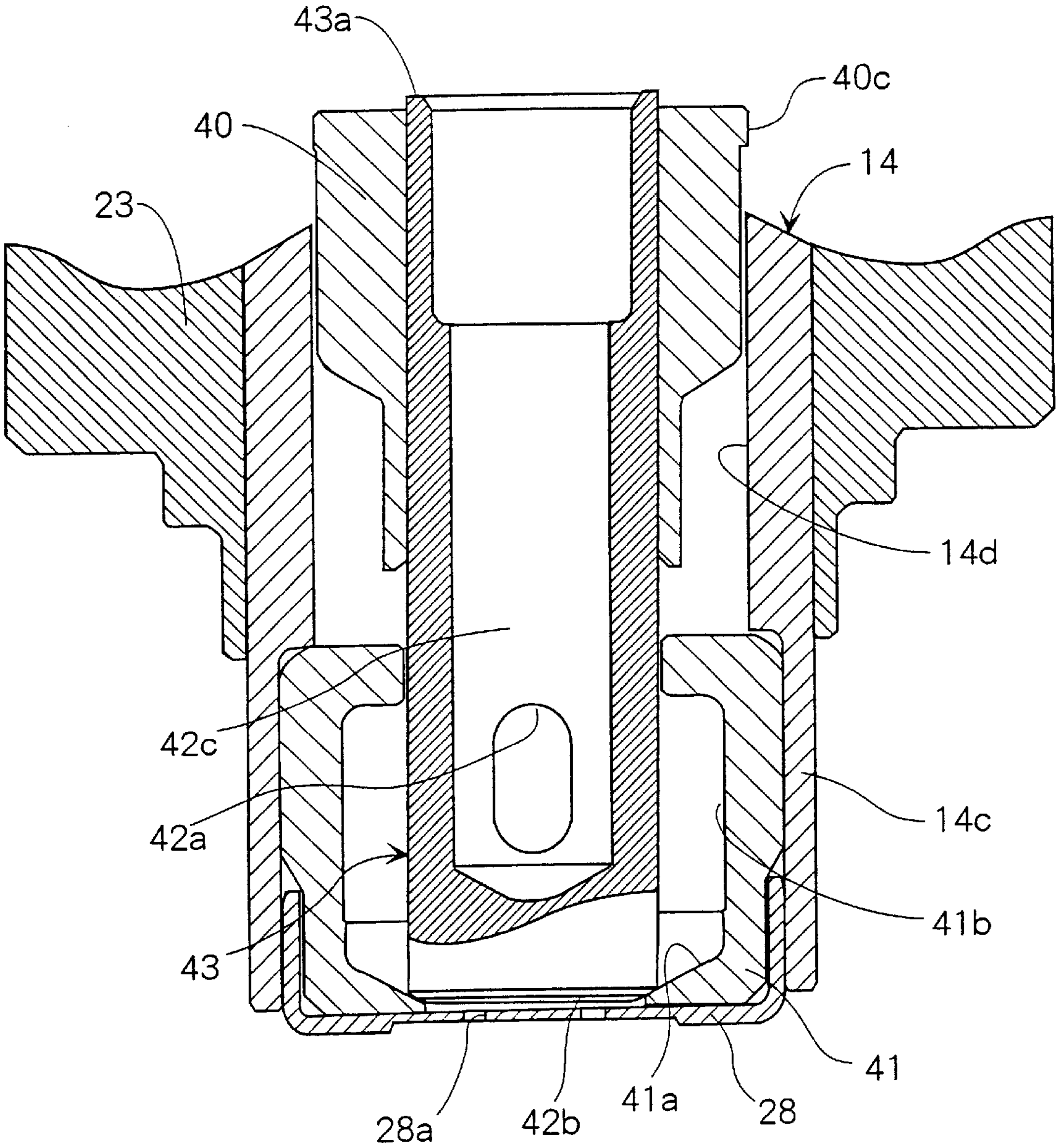
FIG. 4 is a cross sectional part view of a modified fuel injection valve according to the second embodiment.

As an alternative, the nozzle needle 43 may be formed to penetrate axially the armature 40, as shown in FIG. 4. An axial end 43*a* of the nozzle needle 42 protrudes out of the end of the armature 40 on a side of the stator so as to come in contact with stator 22. With this construction, as it is not necessary to cover the axial end 43*a* with the chromium thin film for reinforcement, the fuel injection valve is manufactured at lower cost.

(Third Embodiment)

Figure 5:
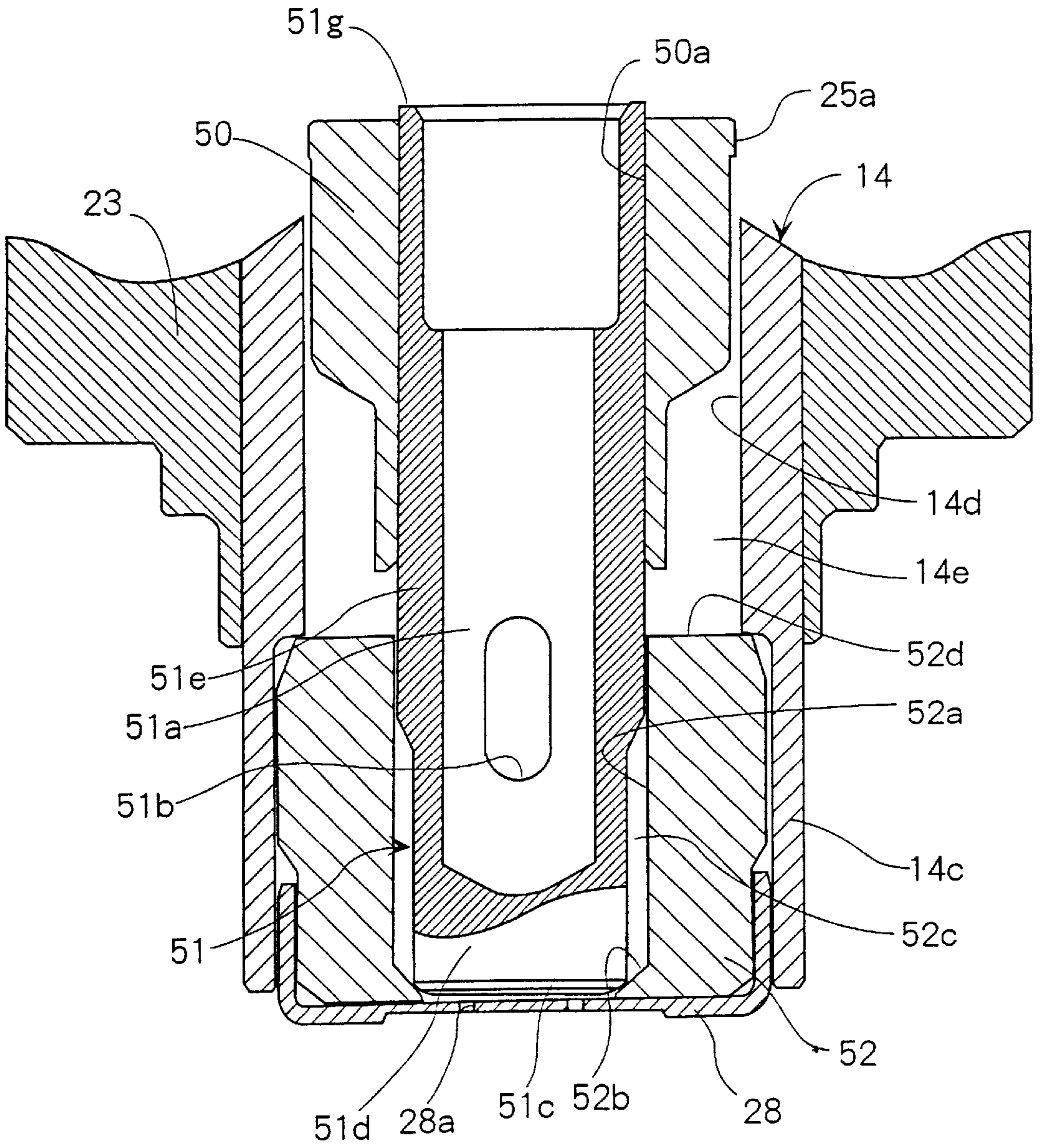
FIG. 5 is a cross sectional part view of a fuel injection valve according to a third embodiment of the present invention.
Figure 6:
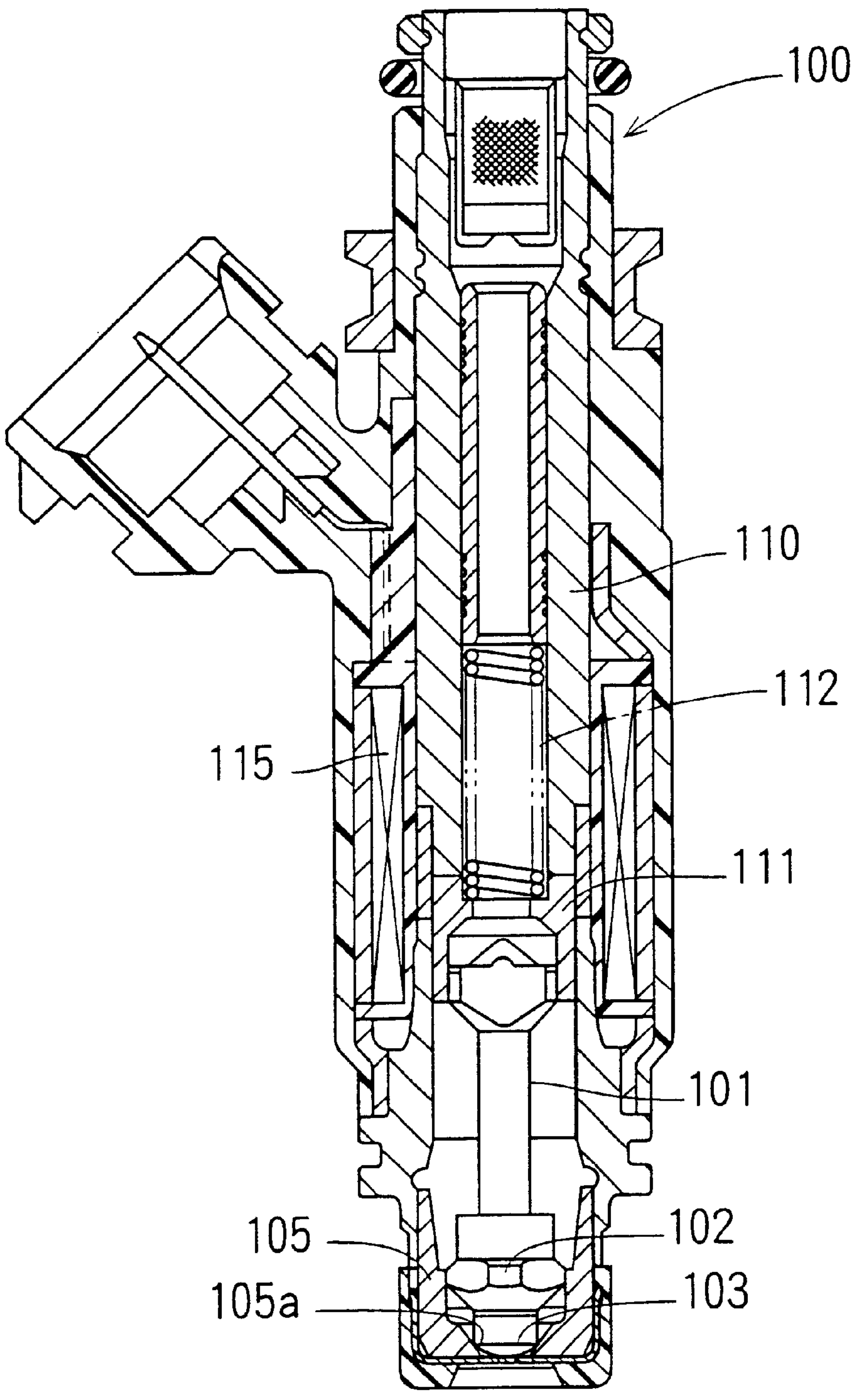
FIG. 6 PRIOR ART
FIG. 6 is a cross sectional whole view of a conventional fuel injection valve as a prior art.

A fuel injection valve according to a third embodiment is described with reference to FIG. 5. A construction of the fuel injection valve not shown in FIG. 5 is substantially same as the fuel injection valve 1 of the first embodiment. The construction of the third embodiment substantially similar as that of the first embodiment is described with the same reference number as the first embodiment.

A valve body 52 is formed in shape of a cylinder whose opening end on a side of fuel injection protrudes radially and inwardly. The valve body 52 is provided on an inner circumferential wall thereof with a conical surface wall 52*b* on a side of fuel injection and a cylindrical surface wall 52*a* on a side of fuel upstream. The conical surface wall 52*b*, whose inner wall diameter is smaller toward a side of fuel injection, constitutes a valve seat on which a contact portion 51*c* of a nozzle needle 51 is seated. The cylindrical surface wall 52 constitutes a fuel accumulation bore 52*c*.

The nozzle needle 42, which is made of stainless steel, is formed in cylindrical shape having a bottom. The nozzle needle 51 is provided on a side of fuel upstream with a large diameter column portion 51*e* whose diameter is slightly smaller than an inner diameter of the cylindrical surface wall 52*a* and provided on a side of fuel injection with a small diameter column portion 51*d* whose diameter is smaller than that of the large diameter column portion 51*e*. An end corner of the small diameter column portion 51*d* on a side of fuel injection is chamfered or tapered to form a conical surface that constitutes the contact portion 51*c*. A diameter of the contact portion 51*c*, that is, a seat diameter, is smaller than that of the cylindrical surface wall 52*a*.

An axial end 51*g* of the large diameter column portion 51*e* on a side of fuel upstream penetrates an armature 50 so as to protrude out of the end of the armature on a side of the stator. The axial end 51*g* comes in contact with the stator 22 with an air gap between the axial end of the armature and an axial end of the stator 22. An outer circumferential wall of the large diameter column portion 51*e* and the cylindrical surface wall 52*a* are in slidable contact with each other so that a slight clearance is formed therebetween. An interior passage 51*a* is formed by drilling a hole from an end of the large diameter column portion 51*e* on a side of fuel upstream. Length of the drilled hole is deep to an extent that a bottom of the nozzle needle 51 sufficiently endures a shock caused on seating itself on the valve seat.

Outlet holes 51*b*, which extends from the large diameter column portion 51*e* to the small diameter column portion 51*d*, are positioned circumferentially at 180-degree angular intervals so as to perforate the large diameter column portion 51*e* radially. The outlet hole 51*b* is formed in oval or flat oval shape. A periphery of the outlet hole 51*b* on a side of fuel injection is formed on an outer circumferential wall of the small diameter column portion 51*d* and another periphery thereof on a side of fuel upstream is formed on an outer circumferential wall of the large diameter column portion 51*e* at a position on a side of fuel upstream with respect to an axial end 52*d* of an valve body 52.

According to the third embodiment, the interior passage 51*a* of the nozzle needle 51 communicates with injection holes 28*a* via a fuel accumulation bore 52 which is formed between the valve body 52 and the small diameter column portion 51*d*. Wall thickness of most part of the nozzle needle 51 is thinner. Accordingly, mass of a movable member composed of the nozzle needle 51 and the armature 50 is relatively small so that the nozzle needle 51 has quicker response characteristic.

What is claimed is:

1. A fuel injection valve comprising:

a housing;

a stator fixed to the housing;

a cylindrical valve body fixed to the housing, the cylindrical valve body being provided at an axial end thereof on a side opposite to the stator with at least an injection hole and having a valve seat protruding radially inward out of an inner wall thereof, which is positioned on a side of the stator with respect to the injection hole, and a needle supporting cylindrical inner wall, which is positioned on a side of the stator with respect to the valve seat;

an armature accommodation bore provided in the housing between the stator and the cylindrical valve body;

an armature movable in the armature accommodation bore;

a coil for exerting an electromagnetic attracting force on the armature so as to be attracted toward the stator when energized;

a nozzle needle fixed to the armature and movable together with the armature in the cylindrical valve body and the armature accommodation bore, while being supported slidably by the needle supporting cylindrical inner wall, the nozzle needle being provided with a valve portion to be seated on the valve seat when the coil is de-energized and inside thereof with a cavity into which fuel is introduced; and a fuel accumulation bore provided between an inner circumference of the cylindrical valve body extending axially from the valve seat to the needle supporting cylindrical inner wall and an outer circumference of the nozzle needle;

wherein the nozzle needle is provided with an opening through which the cavity communicates with the fuel accumulation bore so that, when the valve portion leaves the valve seat upon energizing the coil, the fuel accumulation bore communicates with the injection hole for fuel injection; and the housing has a hollow into which fuel is flown from outside and the stator is provided with a penetrating bore communicating with the hollow of the housing at an axial end thereof and communicating with the armature accommodation bore at another axial end thereof, and the armature has a through-hole for making the armature accommodation bore on a side of the stator communicate with the cavity so that fuel is introduced from the hollow of the housing into the cavity.

2. A fuel injection valve according to claim 1, wherein the nozzle needle penetrates axially along the through-hole of the armature until an axial end thereof protrudes out of an axial end of the armature toward the stator so that fuel is introduced into the cavity from the hollow of the housing via the penetrating bore.

3. A fuel injection valve according to claim 1, wherein the through hole of the armature communicates with the armature accommodation bore on the side of the stator at an axial end thereof and communicates with the cavity at another axial end thereof so that fuel is introduced into the cavity from the hollow of the housing via the penetrating bore and the through-hole.

4. A fuel injection valve according to claim 3, wherein the armature is provided at an axial end thereof on a side of the nozzle needle with an aperture through which the armature accommodation bore communicates with the through-hole.

5. A fuel injection valve comprising:

a housing;

a stator fixed to the housing;

a cylindrical valve body fixed to the housing, the cylindrical valve body being provided at an axial end thereof on a side opposite to the stator with at least an injection hole and having a valve seat protruding radially inward out of an inner wall thereof, which is positioned on a side of the stator with respect to the injection hole, and a needle supporting cylindrical inner wall, which is positioned on a side of the stator with respect to the valve seat;

an armature accommodation bore provided in the housing between the stator and the cylindrical valve body;

an armature movable in the armature accommodation bore;

a coil for exerting an electromagnetic attracting force on the armature so as to be attracted toward the stator when energized;

a nozzle needle fixed to the armature and movable together with the armature in the cylindrical valve body and the armature accommodation bore, while being supported slidably by the needle supporting cylindrical inner wall, the nozzle needle being provided with a valve portion to be seated on the valve seat when the coil is de-energized and inside thereof with a cavity into which fuel is introduced; and a fuel accumulation bore provided between an inner circumference of the cylindrical valve body extending axially from the valve seat to the needle supporting cylindrical inner wall and an outer circumference of the nozzle needle;

wherein the nozzle needle is provided with an opening through which the cavity communicates with the fuel accumulation bore so that, when the valve portion leaves the valve seat upon energizing the coil, the fuel accumulation bore communicates with the injection hole for fuel injection; and the opening is formed to axially stride over the needle supporting cylindrical inner wall so that the cavity communicates not only with the fuel accumulation bore but also with the armature accommodation bore on a side of the cylindrical valve body.

6. A fuel injection valve comprising:

a housing;

a stator fixed to the housing;

a cylindrical valve body fixed to the housing, the cylindrical valve body being provided at an axial end thereof on a side opposite to the stator with at least an injection hole and having a valve seat protruding radially inward out of an inner wall thereof, which is positioned on a side of the stator with respect to the injection hole, and a needle supporting cylindrical inner wall, which is positioned on a side of the stator with respect to the valve seat;

an armature accommodation bore provided in the housing between the stator and the cylindrical valve body;

an armature movable in the armature accommodation bore;

a coil for exerting an electromagnetic attracting force on the armature so as to be attracted toward the stator when energized;

a nozzle needle fixed to the armature and movable together with the armature in the cylindrical valve body and the armature accommodation bore, while being supported slidably by the needle supporting cylindrical inner wall, the nozzle needle being provided with a valve portion to be seated on the valve seat when the coil is de-energized and inside thereof with a cavity into which fuel is introduced; and a fuel accumulation bore provided between an inner circumference of the cylindrical valve body extending axially from the valve seat to the needle supporting cylindrical inner wall and an outer circumference of the nozzle needle;

wherein the nozzle needle is provided with an opening through which the cavity communicates with the fuel accumulation bore so that, when the valve portion leaves the valve seat upon energizing the coil, the fuel accumulation bore communicates with the injection hole for fuel injection; and the nozzle needle is provided with a small diameter column portion whose axial end on a side of the injection hole constitutes the valve portion and with a large diameter column portion whose diameter is larger than that of the small diameter column portion and which is slidably supported by the needle supporting cylindrical inner wall.

7. A fuel injection valve comprising:

a housing;

a stator fixed to the housing;

a cylindrical valve body fixed to the housing, the cylindrical valve body being provided at an axial end thereof on a side opposite to the stator with at least an injection hole and having a valve seat protruding radially inward out of an inner wall thereof, which is positioned on a side of the stator with respect to the injection hole, and a needle supporting cylindrical inner wall, which is positioned on a side of the stator with respect to the valve seat;

an armature accommodation bore provided in the housing between the stator and the cylindrical valve body;

an armature movable in the armature accommodation bore;

a coil for exerting an electromagnetic attracting force on the armature so as to be attracted toward the stator when energized;

a nozzle needle fixed to the armature and movable together with the armature in the cylindrical valve body and the armature accommodation bore, while being supported slidably by the needle supporting cylindrical inner wall, the nozzle needle being provided with a valve portion to be seated on the valve seat when the coil is de-energized and inside thereof with a cavity into which fuel is introduced; and a fuel accumulation bore provided between an inner circumference of the cylindrical valve body extending axially from the valve seat to the needle supporting cylindrical inner wall and an outer circumference of the nozzle needle;

wherein the nozzle needle is provided with an opening through which the cavity communicates with the fuel accumulation bore so that, when the valve portion leaves the valve seat upon energizing the coil, the fuel accumulation bore communicates with the injection hole for fuel injection; and the needle supporting cylindrical inner wall, whose diameter is larger than a diameter of the valve seat, is formed to protrude radially inward out of the inner wall of the cylindrical valve body.

8. A fuel injection valve comprising:

a housing;

a stator fixed to the housing;

a cylindrical valve body fixed to the housing, the cylindrical valve body being provided at an axial end thereof on a side opposite to the stator with at least an injection hole and having a valve seat protruding radially inward out of an inner wall thereof, which is positioned on a side of the stator with respect to the injection hole, and a needle supporting cylindrical inner wall, which is positioned on a side of the stator with respect to the valve seat;

an armature accommodation bore provided in the housing between the stator and the cylindrical valve body;

an armature movable in the armature accommodation bore;

a coil for exerting an electromagnetic attracting force on the armature so as to be attracted toward the stator when energized;

a nozzle needle fixed to the armature and movable together with the armature in the cylindrical valve body and the armature accommodation bore, while being supported slidably by the needle supporting cylindrical inner wall, the nozzle needle being provided with a valve portion to be seated on the valve seat when the coil is de-energized and inside thereof with a cavity into which fuel is introduced; and a fuel accumulation bore provided between an inner circumference of the cylindrical valve body extending axially from the valve seat to the needle supporting cylindrical inner wall and an outer circumference of the nozzle needle;

wherein the nozzle needle is provided with an opening through which the cavity communicates with the fuel accumulation bore so that, when the valve portion leaves the valve seat upon energizing the coil, the fuel accumulation bore communicates with the injection hole for fuel injection; and an outer circumference of the armature is in slidable contact with a circumferential wall constituting the armature accommodation bore in the housing so that the armature is slidably supported by axially spaced two supporting points.

9. A fuel injection valve comprising:

a housing;

a stator fixed to the housing;

a cylindrical valve body fixed to the housing, the cylindrical valve body being provided at an axial end thereof on a side opposite to the stator with at least an injection hole and having a valve seat protruding radially inward out of an inner wall thereof, which is positioned on a side of the stator with respect to the injection hole, and a needle supporting cylindrical inner wall, which is positioned on a side of the stator with respect to the valve seat;

an armature accommodation bore provided in the housing between the stator and the cylindrical valve body;

an armature movable in the armature accommodation bore;

a coil for exerting an electromagnetic attracting force on the armature so as to be attracted toward the stator when energized;

a nozzle needle fixed to the armature and movable together with the armature in the cylindrical valve body and the armature accommodation bore, while being supported slidably by the needle supporting cylindrical inner wall, the nozzle needle being provided with a valve portion to be seated on the valve seat when the coil is de-energized and inside thereof with a cavity into which fuel is introduced; and a fuel accumulation bore provided between an inner circumference of the cylindrical valve body extending axially from the valve seat to the needle supporting cylindrical inner wall and an outer circumference of the nozzle needle, wherein the nozzle needle is provided on an outer circumference thereof with an opening at least part of which is opened to the fuel accommodation bore from the cavity so that the fuel introduced into the cavity flows through the opening to the fuel accumulation bore, and when the valve portion leaves the valve seat upon energizing the coil, the fuel accumulation bore communicates with the injection hole for fuel injection.

10. A fuel injection valve according to claim 9, wherein another part of the opening is radially opposed to the needle supporting cylindrical wall.

11. A fuel injection valve according to claim 9, wherein the valve seat and the needle supporting cylindrical inner wall are integrally formed into a single piece.

12. A fuel injection valve according to claim 9, wherein another part of the opening is opened to the armature accommodation bore from the cavity so that the opening axially strides over the needle supporting cylindrical inner wall.

* * * * *